(No Model.)
S. DARLING.
GRADUATED MEASURE OF LENGTH.
No. 289,512. Patented Dec. 4, 1883.
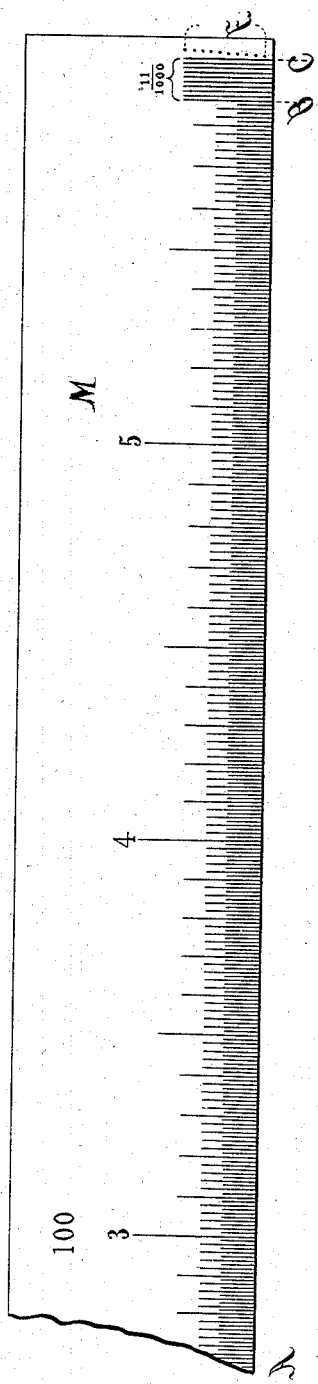
Witnesses
O. J. Beale
K. J. Sunstrom
Inventor:
Sam'l Darling

UNITED STATES PATENT OFFICE.

SAMUEL DARLING, OF PROVIDENCE, RHODE ISLAND.

GRADUATED MEASURE OF LENGTH.

SPECIFICATION forming part of Letters Patent No. 289,512, dated December 4, 1883.

Application filed September 8, 1883. (No model.)

*To all whom it may concern:*

Be it known that I, SAMUEL DARLING, a citizen of the United States, residing at Providence, in the county of Providence and State of Rhode Island, have invented a new and useful Improvement in Graduated Measures of Length; and I do hereby declare that the following is a full, clear, and exact description of the invention, which will enable others skilled in the art to which it appertains to make and use the same.

The object of my invention is to so graduate a measure of length into divisions of ordinary size that it will read, and that measurements can be made with it, to fractional parts of an inch of any practical degree of fineness; and it consists in making a small proportion of the divisions as much larger than the others as the smallest fractional part of an inch which is to be read and used on the measure, all of which will be clearly illustrated and explained in the following specification and drawing.

In the drawing, which represents a measure of length embracing my improvement, M represents one method of constructing the measure. From A to B each division represents one-hundredth (or ten-thousandths) of an inch. From B to C each of the nine divisions represents eleven-thousandths of an inch. With this graduation measurements can be made to one-thousandth of an inch. For example, to measure one inch and seven-thousandths, ninety-three of the divisions of hundredths and seven of the divisions of eleven-thousandths will be required. Again, to measure one hundred and twenty-seven thousandths, five of the hundredth-divisions and seven of the eleven-thousandths must be used. To get a finer division—say ten-thousandths, which would be desirable for many purposes—there can be, in a scale of hundredths, one-hundredth of a division added instead of one-tenth, which would make the scale read to one ten-thousandth of an inch. In the scale of sixty-fourths of an inch, which, with the larger divisions—thirty-seconds, sixteenths, and eighths—is most used by mechanics, by adding one-eighth of a sixty-fourth to itself, it becomes (sufficiently near for ordinary use) one fifty-sixth of an inch, and by making eight of those divisions near one end of the measure, for convenience, an additional scale is produced, by which measurements can be made in eighths of a sixty-fourth, (.0002, proximately,) fifty-sixths, ($\frac{1}{56}$,) twenty-eighths, ($\frac{1}{28}$,) fourteenths, ($\frac{1}{14}$,) and sevenths ($\frac{1}{7}$) of an inch, or by adding one-third of a sixty-fourth, and making eight of such divisions, there can be read a third of a sixty-fourth, ($\frac{1}{192}$,) forty-eighth, ($\frac{1}{48}$,) twenty-fourth, ($\frac{1}{24}$,) twelfth, ($\frac{1}{12}$,) and sixth ($\frac{1}{6}$) of an inch. This scale (sixty-fourths) may also be read in thousandths by adding one-thousandth of an inch to each one of fifteen divisions, which is one-sixteenth of one division, proximately. This mode of graduating not only gives finer divisions than it is practicable to graduate and use in the common way, but it gives an additional scale, which supplies the place of another measure; hence it is obvious that there is hardly a limit to the variety of scales that can be made on this principle of graduating, which must be of great convenience and value. It can also be applied to the graduation of circles as well as to a scale in a straight line.

It may be desirable for some special purposes to add to my improved graduation a line of pricks at an angle with the lines of graduation according to my Patent No. 230,619, August 3, 1880, as shown at E.

Having described my invention, I claim—

1. For making fine measurements, substantially as hereinbefore described, a graduated measure of length having in a continuous line a portion of one or more of its scales made as much larger than the smallest divisions of the same scale as the least fractional part of an inch that is to be read and used upon the scale, such fractional part of an inch being less than said smallest divisions of the scale.

2. A measure of length, M, having a graduated scale, A B, the smallest division of which is ten-thousandths of an inch, and a scale, B C, each division of which is eleven-thousandths of an inch, the surface being sufficiently true and plane for general use with and without the use of dividers, substantially as described.

SAML. DARLING.

Witnesses:
JACOB KETTNER,
JOHN E. HALL.